US006411657B1

(12) United States Patent
Verbin et al.

(10) Patent No.: US 6,411,657 B1
(45) Date of Patent: Jun. 25, 2002

(54) DSL TRANSMITTER WITH DIGITAL FILTERING USING A TOMLINSON-HARASHIMA PRECODER

(75) Inventors: Rami Verbin, Tel-Aviv; Ilan Reuven; David Baum, both of Ramat-Gan, all of (IL)

(73) Assignee: Tioga Technologies Inc., San Jose, CA (US)

( * ) Notice: Subject to any disclaimer, the term of this patent is extended or adjusted under 35 U.S.C. 154(b) by 0 days.

(21) Appl. No.: 09/476,747

(22) Filed: Dec. 30, 1999

(51) Int. Cl.[7] .................................. H04L 1/00
(52) U.S. Cl. ........................ 375/285; 375/296
(58) Field of Search ................ 375/296, 285, 375/348, 350; 348/608, 613

(56) References Cited

U.S. PATENT DOCUMENTS

| | | |
|---|---|---|
| 5,249,200 A | 9/1993 | Chen et al. |
| 5,602,602 A | 2/1997 | Hulyalkar |
| 5,878,086 A | 3/1999 | Hulyalkar |
| 5,881,108 A | 3/1999 | Gosh et al. |
| 5,881,363 A | 3/1999 | Ghosh et al. |
| 6,167,082 A * | 12/2000 | Ling et al. ............... 375/233 |
| 6,201,836 B1 * | 3/2001 | Kim ....................... 375/265 |

OTHER PUBLICATIONS

Wei, Lee–Fang, "Generalized Square and Hexagonal Constellations for Intersymbol–Interference Channels with Generalized Tomlinson–Harashima Precoders", IEEE Transactions on Communiations, vol. 42, No. 9, Sep. 1994, pp. 2713–2721.

Gitlin, Richard et al., "Data Communications Principles", *Applications of Communications Theory,* Plenum Press, New York, Chapter 5, pp. 334–347, and Chapter 7, pp. 500–513.

"The Business Case for VDSL: A White Paper", Orckit Communications, pp. 1–16.

Ciolffi, J. (T1E1.4 VDSL Editor), "Very–high–speed Digital Subscriber Lines—System Requirements", T1E1.4/98–043R6, pp. 1–2, Nov. 1998, Plano, Texas.

Foster, K. et al, Transmission and Multiplexing™; Access transmission systems on metallic access cables; Very high speed Digital Subscriber Line (VDSL); Section 9.3, TS 101 270–1 V1.1.5, p. 36.

http:///www.orkit.com, "What is VDSL?", Orckit Communications—DSL FAQ3, p. 1.

http://www.orckit.com/qam.html, "DSL Knowledge Center—QAM: the Choice for VDSL Transmission Line Code" by Rokach, Ehud, 1998, pp. 1–2.

\* cited by examiner

*Primary Examiner*—Amanda T. Le
(74) *Attorney, Agent, or Firm*—Abelman, Frayne & Schwab

(57) ABSTRACT

A high-speed transmitter, which generates an output signal stream having a specified spectral profile. The transmitter includes a Tomlinson-Harashima precoder, which is adapted to receive a sequence of input symbols having a given input constellation and to generate, responsive to the specified spectral profile, a corresponding sequence of precoded symbols. A transmit digital filter is adapted to apply a transmit filter response, in accordance with the specified spectral profile, to the precoded symbols so as to generate a corresponding sequence of output symbols, having a given output constellation, to be transmitted in the output stream.

30 Claims, 6 Drawing Sheets

DSL TRANSMITTER WITH DIGITAL FILTERING USING A TOMLINSON-HARASHIMA PRECODER

FIELD OF THE INVENTION

The present invention relates generally to high-speed data communications, and specifically to transmission of Very High Rate Digital Subscriber Line (VDSL) signals.

BACKGROUND OF THE INVENTION

Digital Subscriber Line (DSL) is a modem technology that enables broadband digital data to be transmitted over twisted-pair wire. DSL modems allow users to access digital networks at speeds tens to hundreds of times faster than current analog modems and basic ISDN service. A range of DSL standards has been defined, known generically as "xDSL," wherein the various standards have different data rates and other associated features but share common principles of operation. VDSL (Very High Rate Digital Subscriber Line) is the next-generation technology in the DSL family, offering data rates up to 52 Mbit/s over short runs.

DSL modems transmit data that has been line coded (i.e., modulated) n accordance with either a single-carrier or a multi-carrier modulation scheme. Single-carrier schemes for VDSL include Quadrature Amplitude Modulation (QAM) and Carrierless Amplitude Modulation (CAP). These schemes are described, for example, by Gitlin et al., in *Data Communications Principles* (Plenum Press, New York, 1992), pp. 334–347, which is incorporated herein by reference. In QAM, input data values are mapped for transmission to a sequence of symbols, each having a certain amplitude and phase. Each symbol can be represented by a complex number, which is a point in a two-dimensional "constellation" of symbols. Data for VDSL transmission may be coded before modulation, using any of a variety of suitable coding schemes known in the art, or may alternatively be uncoded.

DSL transmission channels are often subject to severe inter-symbol interference, due to amplitude distortion in the frequency domain. The accepted solution to this problem is to use a decision feedback equalizer (DFE) in the receiver, in order to cancel interference from past signals. One of the problems caused by such a DFE is error propagation, since once an error has been introduced into one of the samples, the DFE will "remember" the error over many subsequent samples.

If the channel impulse response is known, a suitable Tomlinson-Harashima precoder can be used in the transmitter, and can eliminate the need for the DFE in the receiver. Precoders of this sort are described by Wei, in an article entitled, "Generalized Square and Hexagonal Constellations for Intersymbol-Interference Channels with Generalized Tomlinson-Harashima Precoders," published in *IEEE Transactions on Communications*, 42:9 (September, 1994), pp. 2713–2721, which is incorporated herein by reference. The precoder in this context is intended to compensate for interference in a channel having an equivalent discrete-time response expressed as $$1 + \sum_{i=1}^{k} h_i Z^{-i}.$$

The Tomlinson-Harashima precoder comprises a two-dimensional modulo device with a negative feedback loop. The modulo device takes each complex input symbol that it receives, r, into an output symbol s given by:

$$s_i = r_i - k_i \cdot 2L \tag{1}$$

wherein $i=1,2$, giving the real and imaginary parts of s and r; $2L$ is the modulo value; and $k_i$ is an integer such that $-L < s < L$. In the feedback loop, the symbols output by the modulo device are filtered by a digital filter having a discrete time response based on the equivalent discrete-time response of the channel, without the zero-order time-domain component. In other words, the filter response in the feedback loop is given by $$\sum_{i=1}^{k} h_i Z^{-i}.$$

The filtered feedback symbols are subtracted from the modulated symbols (whether coded or uncoded) that are input to the precoder for transmission.

In the receiver, the channel-distorted symbols are input to a modulo device, which is identical to that in the precoder. Assuming that the feedback filter response is well-matched to the actual response of the channel, the symbols output by the modulo device in the receiver will be identical, to within the white Gaussian noise added by the channel, to the modulated symbols that were input to the precoder for transmission. The output symbols can then be processed by a decision device or Viterbi decoder, as appropriate, to recover the input data.

U.S. Pat. No. 5,249,200, to Chen et al., whose disclosure is incorporated herein by reference, describes a device and method for combining precoding with symbol-rate spectral shaping. A data transmitter, which transmits signals to a receiver over a transmission channel, includes a Tomlinson precoding unit and a spectral shaping unit. The equivalent channel response is determined and conveyed to the preceding and shaping units, which adjust the spectral properties of the transmitted signals in accordance with the determined channel response. The precoding and shaping units may also be used independently of one another.

A further difficulty in transmitting data over twisted pair at DSL rates is that a substantial amount of radio-frequency (RF) radiation is inevitably emitted. It has been found that this emission can cause serious interference with amateur radio transmissions, particularly in the HF range. For this reason, emerging technical specifications for VDSL place strict upper limits on the radiation levels that VDSL systems are allowed to generate in HF bands that are set aside for amateur radio, such as 1.81–2.0 MHz, 3.5–4.0 MHz and other, higher-frequency bands. To meet these requirements, system designers typically add notch filters in the output circuits of their modems to attenuate signals in the forbidden frequency ranges. Such notch filters complicate the design not only of VDSL transmitters, but also of receivers. The VDSL receiver must compensate not only for distortion by the communication channel, but also for the distortion introduced in the transmitter output itself by the notch filters.

The conventional solution to this problem is to use an adaptive Decision Feedback Equalizer (DFE) in the receiver with a relatively large number of taps (together with a Forward Filter Equalizer—FFE). Decision feedback equalization is described, for example, in the above-mentioned book by Gitlin et al., incorporated herein by reference, pp. 500–513. The long DFE, with many taps, is undesirable for a number of reasons, including:

Error propagation—the longer the DFE, the longer will be the error bursts due to error propagation.

The equalizer might not converge to its optimal values, resulting in a performance loss, typically of ~1 dB. Advanced adaptation methods may decrease this performance loss, but at the cost of significant additional complexity.

Slower convergence of the adaptive equalizer.

SUMMARY OF THE INVENTION

It is an object of some aspects of the present invention to provide an improved high-speed data modem.

It is a further object of some aspects of the present invention to provide methods and apparatus that enable enhanced control of the spectral profile of high-speed data transmissions.

It is still a further object of some aspects of the present invention to provide improved methods and circuitry for notch filtering of digital data transmissions.

In preferred embodiments of the present invention, a high-speed data transmitter comprises a digital transmit (Tx) filter, which filters the symbols in the transmit oath of the modem in accordance with a specified spectral profile. The profile typically includes one or more notches, such as are required for eliminating radio-frequency interference (RFI) due to the transmitter in specified, forbidden frequency bands. The symbols to be filtered by the digital Tx filter are first precoded by a Tomlinson-Harashima precoder. The precoder comprises a modulo device, as described hereinabove, and a feedback filter having a response that is substantially equal to the response of the Tx notch filter, less a zero-order time-domain component of the Tx filter response. As a result of the preceding and digital filtering, the symbols output by the transmitter have an expanded output constellation (relative to the input constellation), with a frequency spectrum in accordance with the specified profile. Frequency components in the forbidden bands are suppressed in the output.

Signals output by the transmitter are received over a communication channel by a receiver, which comprises a decision block and a modulo reduction device. The decision block preferably comprises a Forward Filter Equalizer (FFE) and a Decision Feedback Equalizer (DFE), together with a decision device. The FFE and DFE compensate for distortion in the received signals, which is generally due only to channel distortion, since distortion in the transmitter itself is substantially eliminated by the use of the Tomlinson-Harashima precoder. The decision device processes the equalized signals to generate symbols having a restored constellation that is substantially the same as the expanded output constellation of the transmitter. The modulo reduction device simply takes a modulo of each of the restored symbols in order to recover the original input symbols.

Thus, in preferred embodiments of the present invention, the Tomlinson-Harashima precoder is used in a novel fashion, as part of a digital filtering network within the transmitter itself, rather than to compensate for channel characteristics outside the transmitter. As a result of this precoding, there is no need for the DFE in the receiver to compensate for the effects of the notch filters or other shaping that must be imposed on the transmitted spectrum. The modulo devices in the transmitter and the receiver work in concord to eliminate the notch filter effects, substantially without the need for any processing parameters to be passed between them.

Transmitters and receivers in accordance with preferred embodiments of the present invention thus nave the following advantages:

No need to add taps to the DFE due to the Tx filtering. The result is lower sensitivity to error propagation and better and easier convergence of the equalizer.

Lower complexity. The precoder (like the notch filter) can be implemented with a very efficient IIR scheme, whereas DFE implementation requires FIR scheme with much greater complexity.

Simplified pulse shaping. Typically, the output of the Tx filter is passed to a pulse shape filter (typically a square root raised cosine filter). Because the Tx filter output includes the extended constellation points (which is not the case when a conventional Tomlinson-Harashima precoder is used), this output can be represented using only a small number of bits per symbol. Therefore, the pulse shape filter can be implemented in a very efficient way, using multipliers with a small number of bits. This advantage is significant, since the pulse shape filter is typically a long FIR filter.

Adaptivity. There is no need to adapt the precoder coefficients. The adaptive DFE (and FFE) take care of any changes in the channel, while the precoder handles only the constant spectral modification applied by the Tx filtere.

Interoperability. The transmitter is set to perform the required preceding and filtering without reference to the receiver. The implications on the receiver side are minor at most. No communication is required between the transmitter and the receiver during startup.

The present invention is applicable particularly to next-generation, ultra-high speed transmission systems, such as VDSL and standards under development by the HPNA (Home Phone Networking Association). It may, however, be adapted for use in substantially any transmitter/receiver pair that communicate by single-carrier modulation, whether using real or complex signal modulation schemes. While preferred embodiments are described herein mainly with reference to notch filtering, a wide range of other digital filter types may be used in the context of the present invention, including both infinite impulse response (IIR) and finite impulse response (FIR) types. The Tomlinson-Harashima precoder and filter of the present invention may also be used in conjunction with an adaptive digital filter for the purpose of "water filling," i.e., to shape the output power spectral density of a transmitter to optimally match the spectral characteristics of the communication channel.

There is therefore provided, in accordance with a preferred embodiment of the present invention, a high-speed transmitter, which generates an output signal stream having a specified spectral profile, the transmitter including:

a Tomlinson-Harashima precoder, which is adapted to receive a sequence of input symbols having a given input constellation and to generate, responsive to the specified spectral profile, a corresponding sequence of precoded symbols; and a transmit digital filter, which is designed to apply a transmit frequency response, in accordance with the specified spectral profile, to the precoded symbols. This filter together with the precoder generates a corresponding sequence of output symbols, having a given output constellation, to be transmitted in the output stream.

Preferably, the output constellation is expanded relative to the Input constellation, such that the input symbols in the sequence can be recovered by taking a modulo of the corresponding output symbols. Most preferably, the input and output symbols have respective real and imaginary parts, and the real and imaginary parts of the input symbols in the sequence can be recovered by taking a two-dimensional modulo of the real and imaginary parts of the corresponding output symbols.

In a preferred embodiment, the digital filter includes a notch filter, which is configured to prevent radio-frequency interference due to the output stream of the transmitter in a predetermined frequency band, as specified by the spectral profile.

Preferably, the transmitter is configured to transmit the output stream over a channel having given spectral characteristics, and the spectral profile is specified substantially independently of the spectral characteristics of the channel. Optionally, the precoder and digital filter are further configured to optimize an output power spectral density of the transmitter responsive to the spectral characteristics of the channel.

Preferably, the precoder includes:
a feedback digital filter, which is adapted to apply a feedback filter response to the sequence of precoded symbols so as to generate a corresponding sequence of feedback symbols, wherein the feedback filter response is substantially equal to the transmit filter response less a zero-order time-domain component of the forward filter response;
a subtractor, adapted to subtract the feedback symbols from the corresponding input symbols, so as to generate a corresponding sequence of subtracted symbols; and
a modulo mapping device, adapted to map the subtracted symbols to the corresponding precoded symbols, such that each of the subtracted symbols in the sequence can be recovered by taking a modulo of the corresponding precoded symbol.

Preferably, the symbols include Quadrature Amplitude Modulation (QAM) symbols, having respective real and imaginary parts, and the modulo mapping device is adapted to map both the real and imaginary parts of the subtracted symbols.

In a preferred embodiment, the output signal stream includes Very High Rate Digital Subscriber Line (VDSL) signals.

In another preferred embodiment, a receiver is adapted to receive the output stream generated by the transmitter and transmitted over a channel, the receiver including:
a decision block, adapted to process the output stream so as to substantially recover the expanded sequence of output symbols; and
a modulo reduction device, adapted to take a module of each of the recovered output symbols so as to generate the corresponding input symbol.

There is also provided, in accordance with a preferred embodiment of the present invention, a receiver, adapted to receive an input stream of digital data containing a sequence of input symbols having a given constellation, wherein the input symbols are derived from a corresponding sequence of original symbols by a transmitter that includes a Tomlinson-Harashima precoder and are transmitted over a channel, the receiver including:
a decision block, which is configured to process the input stream so as to substantially recover the sequence of input symbols from the input stream; and
a modulo reduction device, adapted to take a modulo of each of the recovered input symbols so as to generate the corresponding original symbol.

Preferably, the decision block includes:
a forward filter equalizer (FFE), which is configured to apply forward equalization to the input stream so as to generate a sequence of forward-equalized symbols;
a decision feedback equalizer, which is configured to apply decision feedback filtering to the recovered sequence of input symbols, so as to generate a corresponding sequence of decision feedback symbols;
an adder, adapted to add the decision feedback symbols to the forward-equalized symbols to generate a corresponding sequence of corrected symbols; and
an extended slicer, adapted to assign each of the corrected symbols to a corresponding value in the given constellation, thereby to substantially recover the sequence of input symbols.

Preferably, the input symbols include Quadrature Amplitude Modulation (QAM) symbols, having respective real and imaginary parts, and wherein the modulo reduction device is adapted to take a modulo of both the real and imaginary parts of the recovered input symbols. Further preferably, the input stream of digital data includes Very High Rate Digital Subscriber Line (VDSL) signals.

There is further provided, in accordance with a preferred embodiment of the present invention, a method for generating an output stream of digital data having a specified spectral profile, the method including:
providing a sequence of input symbols having a given input constellation;
preceding the input symbols using Tomlinson-Harashima preceding responsive to the specified spectral profile, so as to generate a corresponding sequence of precoded symbols; and
filtering the precoded symbols in accordance with the specified spectral profile, so as to generate a corresponding sequence of output symbols to be transmitted in the output stream, the output symbols having a given output constellation.

The present invention will be more fully understood from the following detailed description of the preferred embodiments thereof, taken together with the drawings in which:

DETAILED DESCRIPTION OF A PREFERRED EMBODIMENT

Figure 1:
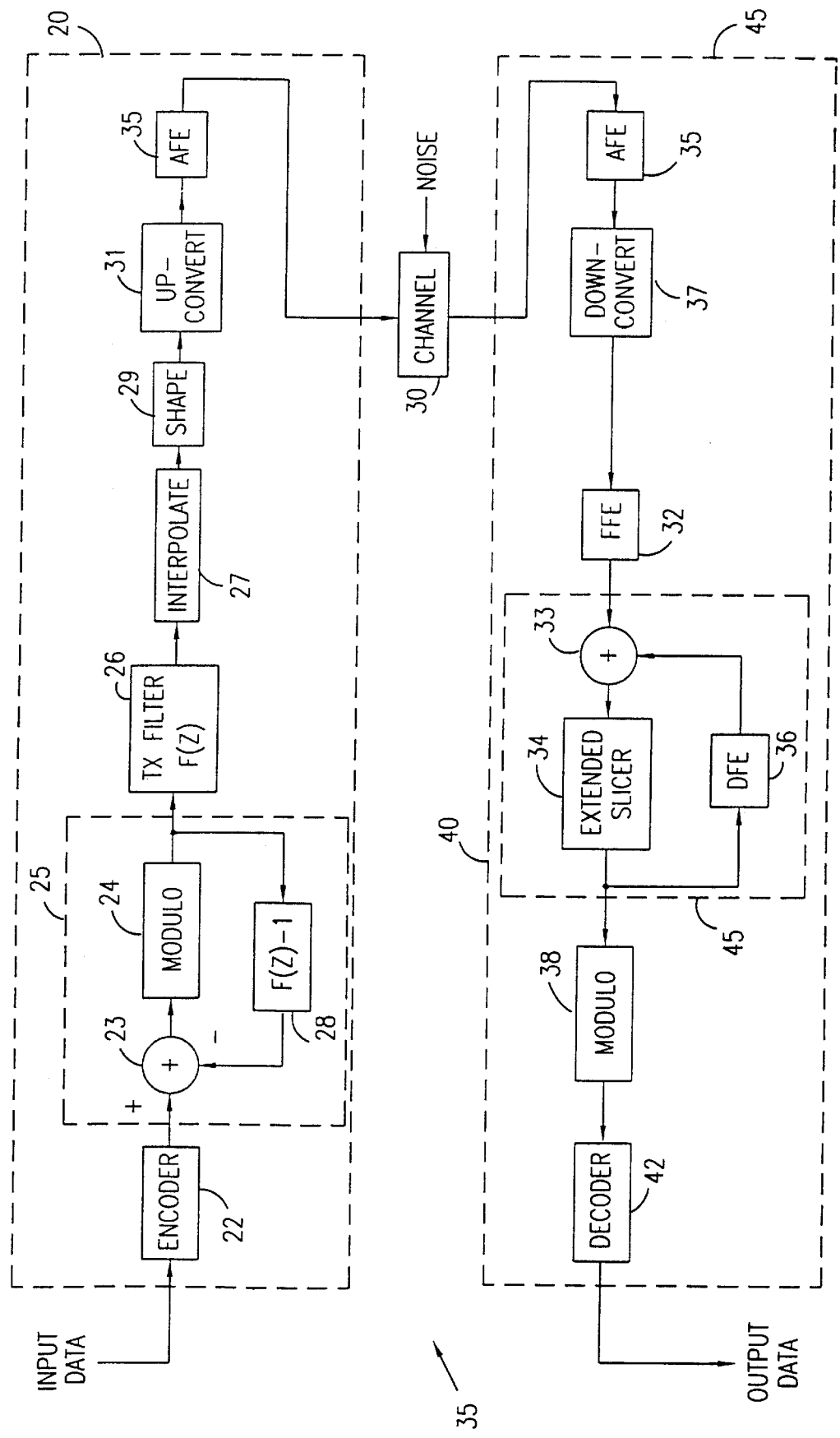
FIG. 1 is a block diagram that schematically illustrates a high-speed data transmitter and receiver, in accordance with a preferred embodiment of the present invention.

FIG. 1 is a block diagram that schematically illustrates a system 35 for high-speed data communications, in accordance with a preferred embodiment of the present invention. The system comprises a transmitter 20 and a receiver 40, linked by a communication channel 30. Preferably, system 35 is a VDSL system, although the principles embodied in the system are similarly applicable to communications in accordance with other standards.

Transmitter 20 comprises a data encoder 22, which receives a stream of digital input data samples from a data source, and generates a corresponding sequence of QAM symbols. Encoder 22 may apply substantially any suitable modulation scheme known in the art, including both coded and uncoded schemes. The symbols generated by the modulator are input to a Tomlinson-Harashima precoder 25, which precodes the symbols, as described in detail hereinbelow. The precoded symbols are then filtered by a transmit (Tx) digital filter 26, operating in cooperation with precoder 25.

Following precoder 25, transmitter 20 includes further processing and output circuits, as are known in the art. Preferably, an interpolator 27 is used to up-sample the symbol stream, and a shaper 29 applies square root raised-cosine shaping to the filtered symbols, for the purpose of reducing inter-symbol interference. Further preferably, the shaper applies a power spectral density (PSD) mask filter to the symbols. The shaped signals are passed to an up-converter 31, and from there to analog front end (AFE) circuitry 35.

Preferably, precoder 25 and digital filter 26 function cooperatively, as described hereinbelow, to impose a notch filter on the transmitted signals. The notch filter is typically designed to attenuate the spectral power of the transmitter output in certain spectral bands, such as HF amateur radio bands, in which radio frequency (RF) emission from system 35 may cause interference. Alternatively or additionally, the precoder and filter may be adapted to perform other filtering and spectral shaping functions.

Typically, a first stage of the transmitter, including precoder 25 and digital filter 26, operates at the transmitter symbol rate, while a second stage, including shaper 29 and up-converter 31, for example, operates at twice the symbol rate. (Interpolator 27 performs the required up-sampling between the first and second stages.) The precoder preferably compensates for the first stage, i.e., for the filtering that is implemented in the symbol rate clock. The advantage of this implementation is that the output of this stage into the second stage includes extended constellation data, as described hereinbelow, which requires only small number of bits. This quality allows efficient implementation of the second stage. Other implementations that compensate in the precoder for the filters in both the first stage and the second stage are also possible.

Thus, digital filter 26 applies a selected filter response to the symbols that are input to it by precoder 25. In the most general terms, this response can be expressed in the time domain as:

$$F(z) = \sum_{i=0}^{\infty} h_i Z^{-i} \qquad (2)$$

For a complex notch filter, as is known in the art, F(z) can also be expressed as:

$$F(z) = \frac{1 - e^{j\varphi}Z^{-1}}{1 - Re^{j\varphi}Z^{-1}} \qquad (3)$$

wherein R is a real constant. In this case, as well as in many other practical filters, the zero-order time-domain component $h_0=1$. The notch filter can also include a combination of filters of this type so as to create a wider notch or multiple notches at different frequencies.

Precoder 25 comprises a modulo device 24 and a feedback filter 28. The modulo device operates generally as described in the above-mentioned article by Wei. For square constellations (typical when an even number of bits is used) the modulo operation can be performed separately on the real and imaginary parts of the signal. Preferably, for each input symbol $a_n$, having real and imaginary parts, $a_n^{(1)}$ and $a_n^{(2)}$ respectively, the modulo device generates an output symbol $x_n$ having real and imaginary parts $x_n^{(1)}$ and $x_n^{(2)}$ given by:

$$x_n^{(i)} = a_n^{(i)} +/- b_n^{(i)} + 2M \qquad (4)$$

Where $b_n^{(i)}$ (i=1,2) is a integer number chosen such that $x_n^{(1)}$ is limited to the range (−M,M]. In the embodiment of the present invention used in generating the plots shown in the figures, M=8. Alternatively, however, other values of M may be chosen, and different constellation shapes may be used, as described by Wei, for example.

Feedback filter 28 applies a filter response, given by F(z)−1, to the symbols output by modulo device 24. The response of the feedback filter can thus be expressed simply as the response F(z) of forward filter 26, less the zero-order time-domain component:

$$F(z) - 1 = \sum_{i=1}^{\infty} h_i Z^{-i} \qquad (5)$$

Filter 28 is connected to modulo device 24 in a negative feedback loop by an adder 23. The plots described hereinbelow show the effects of precoder 25 and filter 26 on the symbols transmitted by transmitter 20.

Figure 2A:
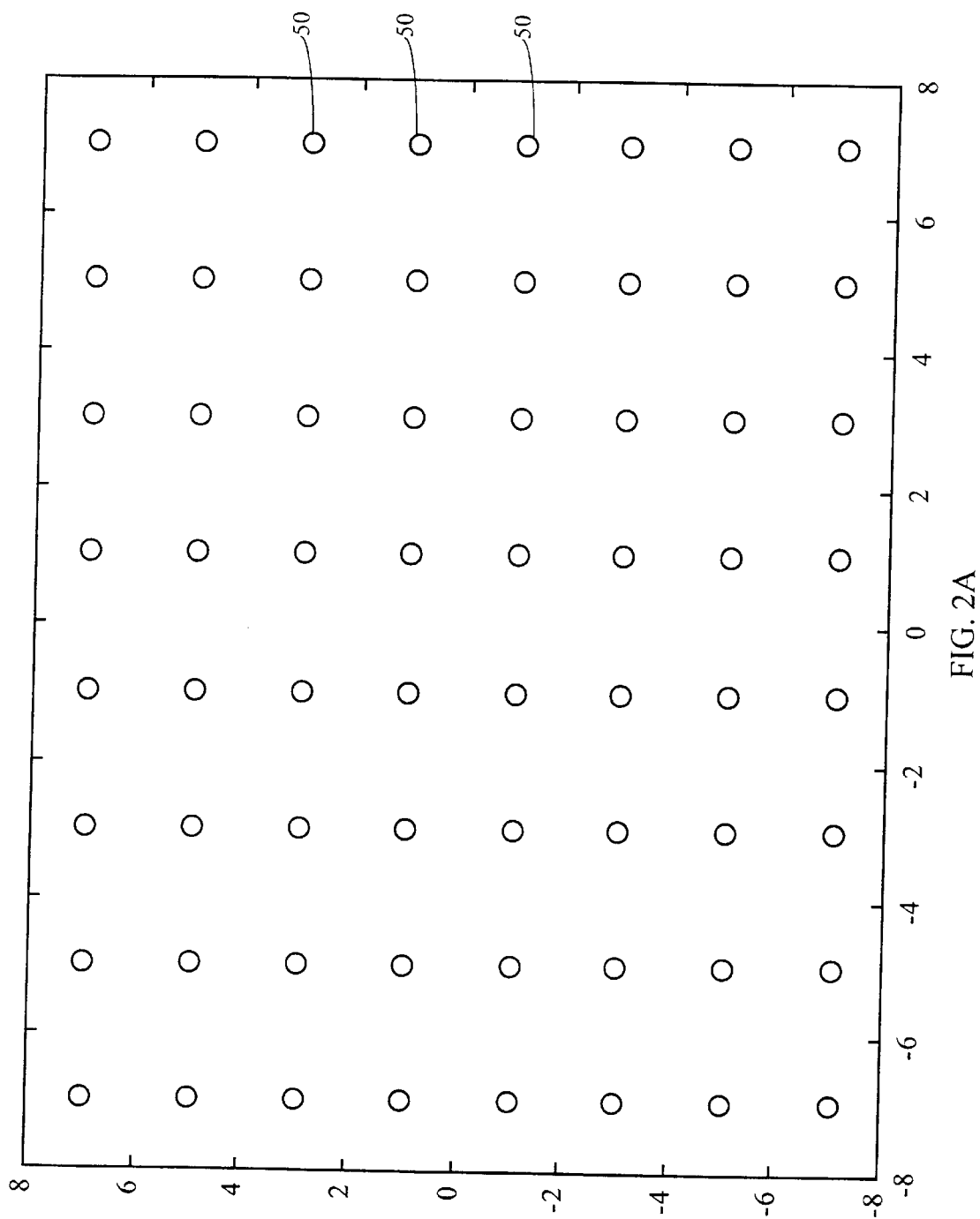
FIG. 2A is a plot that schematically illustrates an input constellation of symbols in the transmitter of FIG. 1, in accordance with a preferred embodiment of the present invention.
Figure 2B:
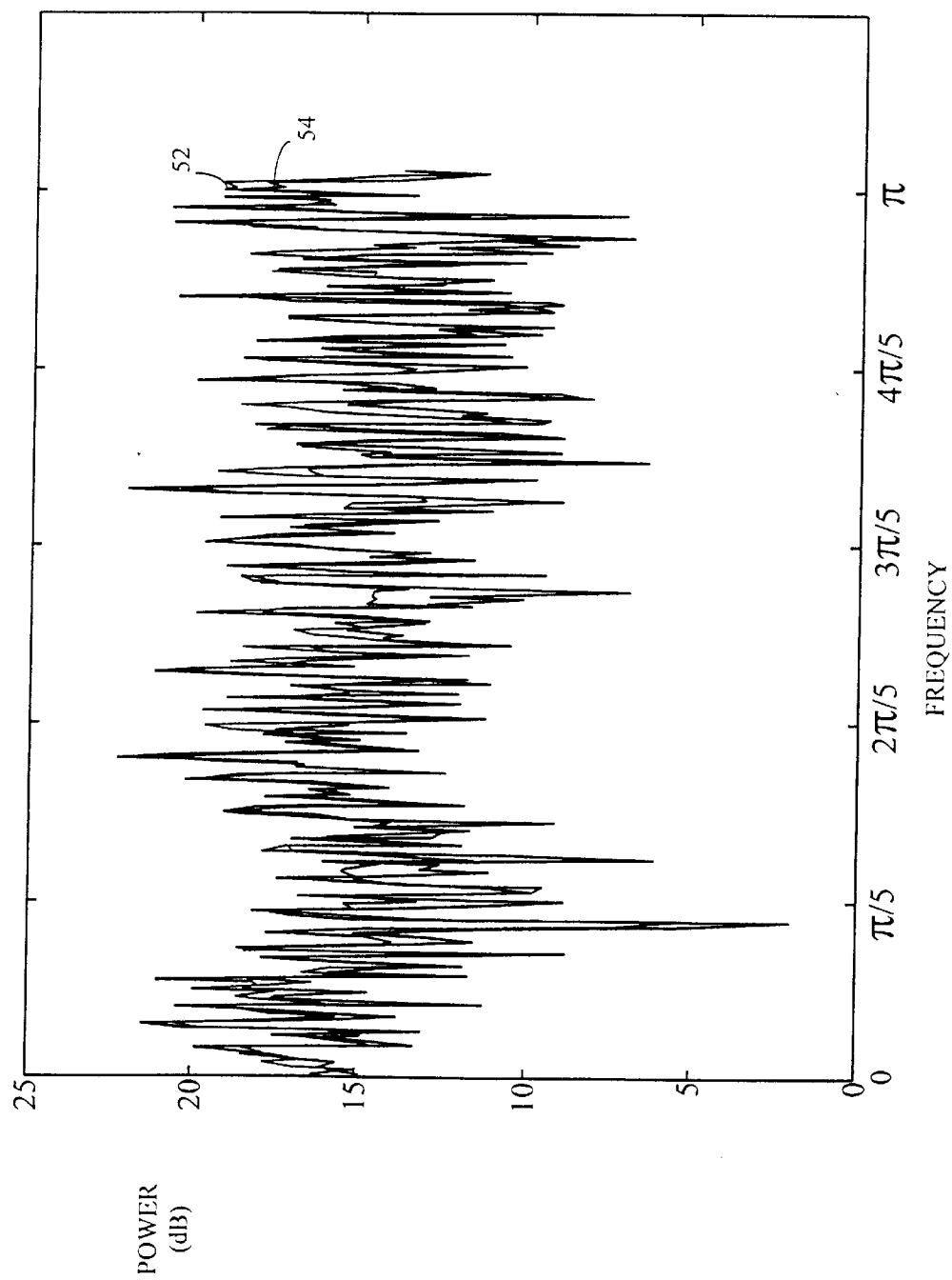
FIG. 2B is a plot that schematically illustrates a spectrum corresponding to the symbols of FIG. 2A.

FIGS. 2A and 2B are plots that schematically illustrate characteristics of input symbols generated by encoder 22 for input to precoder 25, in accordance with a preferred embodiment of the present invention. As shown in FIG. 2A, the symbols are distributed in an evenly-spaced, 8×8 constellation, as is known in the art, wherein each possible symbol is represented by a mark 50. FIG. 2B shows a simulated spectrum generated when these symbols are transmitted by transmitter 20 without precoding or filtering. FIG. 2B shows the spectrum at the input to shaper 29, which is identical in this case to the output of encoder 22. The frequency range of the plot is normalized by the sampling rate to be from 0 to 0.5, wherein 0.5 represents half of the sampling frequency. The spectrum is uniform over the frequency range.

Figure 3:
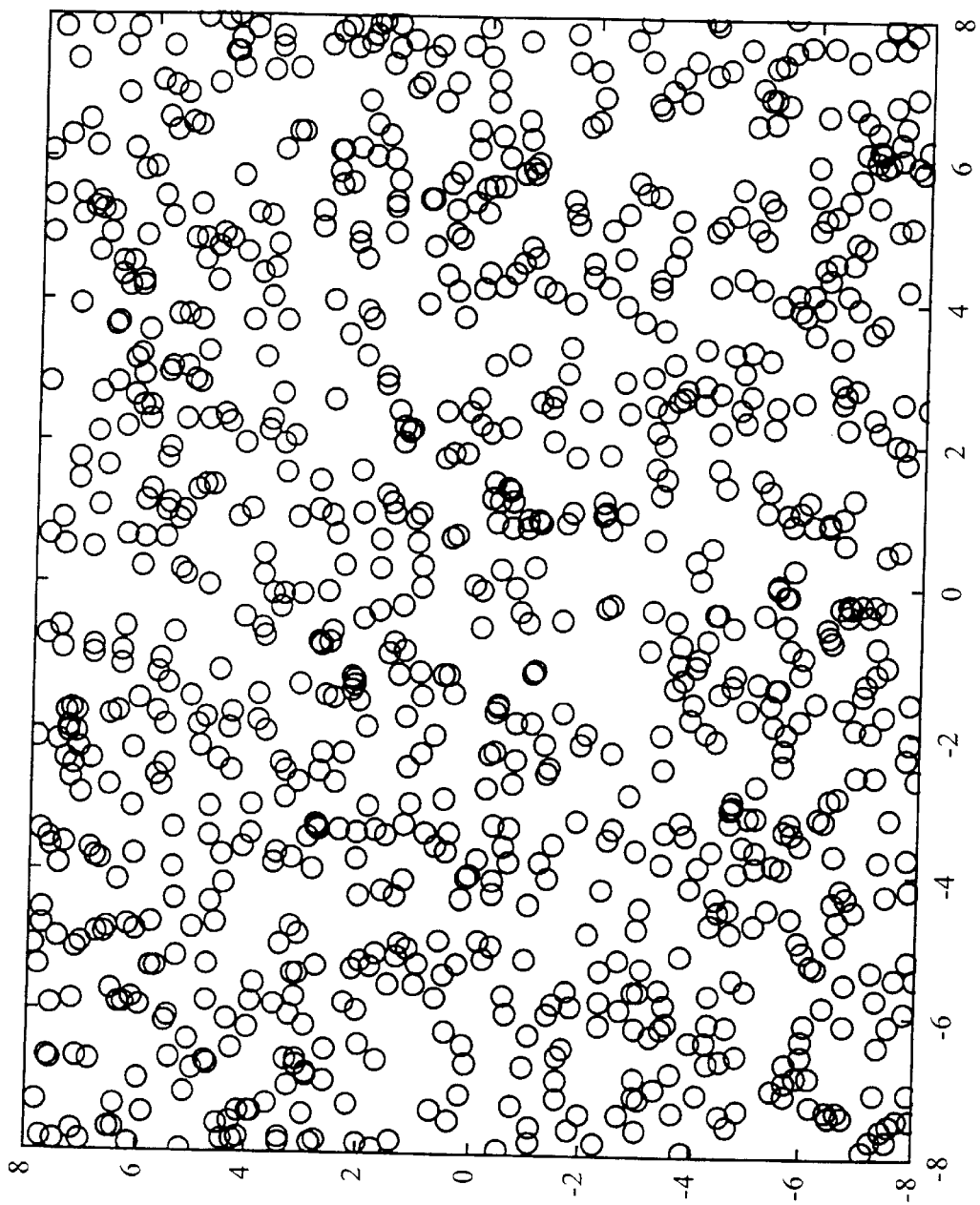
FIG. 3 is a plot that schematically illustrates a constellation of precoded symbols generated in the transmitter of FIG. 1, in accordance with a preferred embodiment of the present invention.

FIG. 3 is a plot that schematically illustrates interim, precoded symbols generated by precoder 25, operating on the input symbols of FIG. 2A, in accordance with a preferred embodiment of the present invention. The seemingly-random constellation of FIG. 3 shows the effect of feedback filter 28. The operation of modulo device 24, with M (in equation 4) set to the value 8, generates precoded symbols whose real and imaginary parts are both within respective ranges from −8 to 8.

Figure 4A:
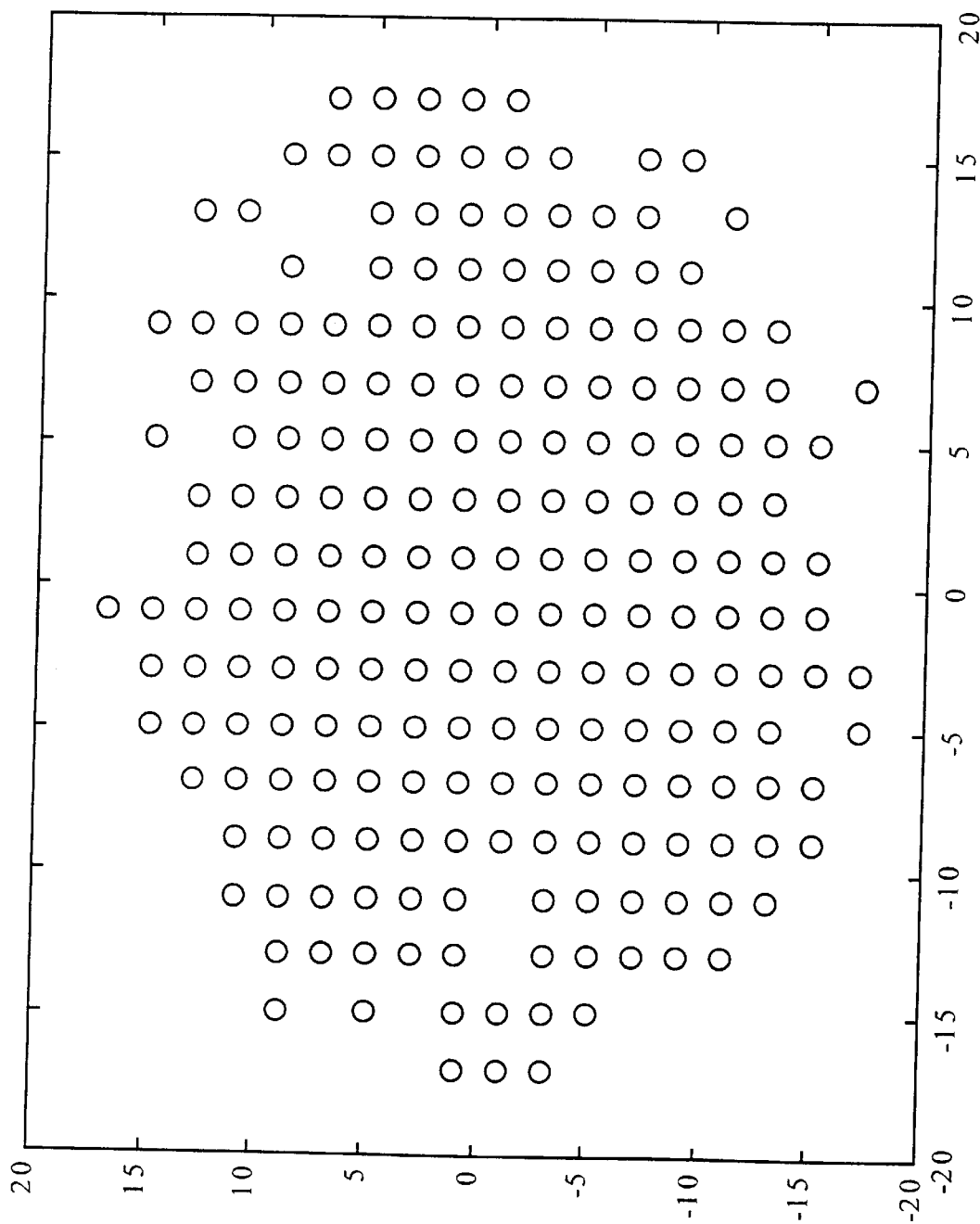
FIG. 4A is a plot that schematically illustrates a constellation of output symbols generated by the transmitter of FIG. 1, in accordance with a preferred embodiment of the present invention.
Figure 4B:
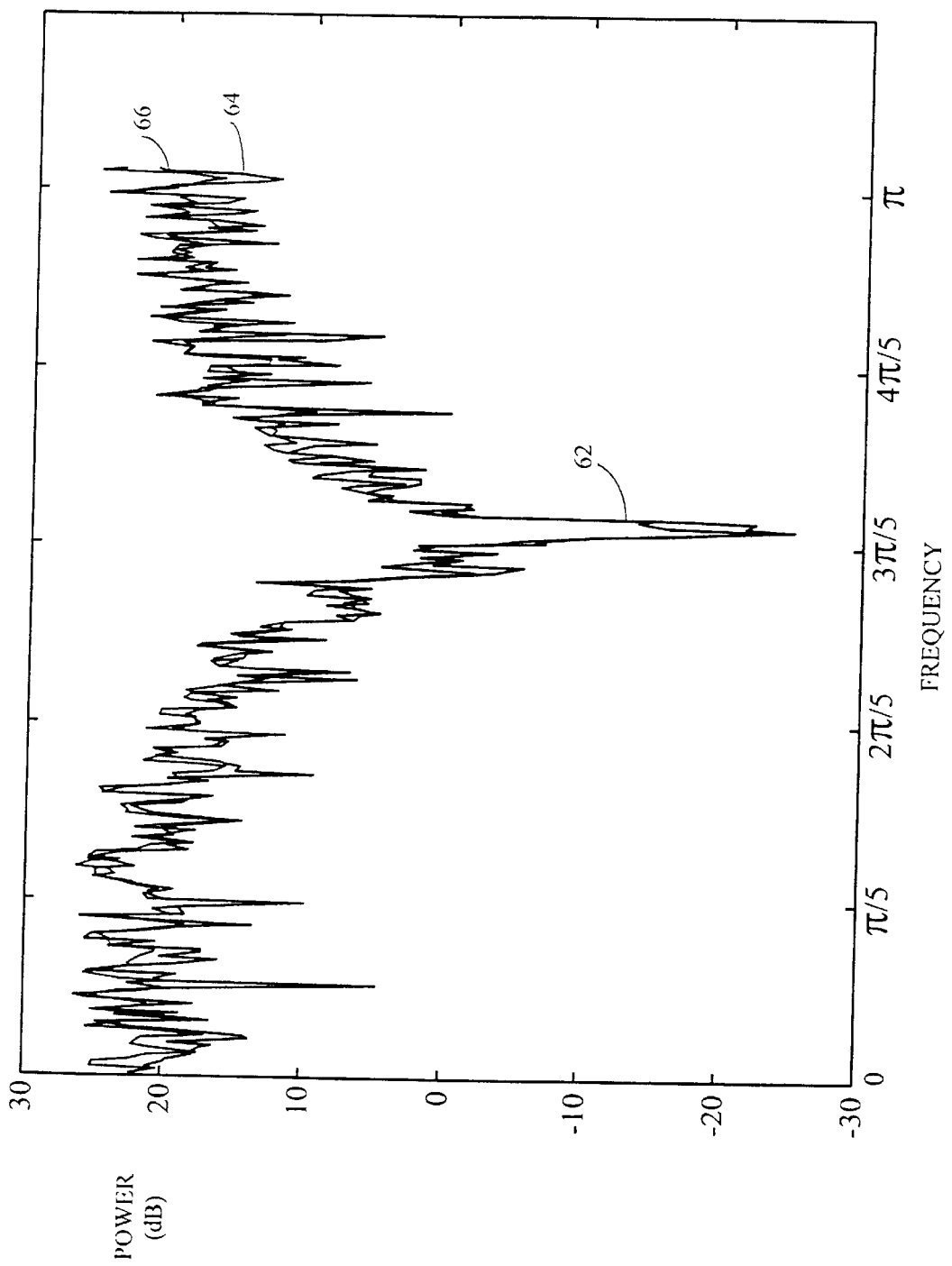
FIG. 4B is a plot that schematically illustrates a spectrum corresponding to the symbols of FIG. 4A.

FIGS. 4A and 4B are plots that schematically illustrate characteristics of the output symbols generated by filter 26, in accordance with a preferred embodiment of the present invention. The constellation of the symbols, shown in FIG. 4A, is expanded due to the effect of the filter. Every one of the points in the expanded output constellation is represented by a mark 60. The complex value of each point in the output constellation is shifted by $(B_{real}+j*B_{imag})\cdot 2M$ relative to the corresponding input constellation point, wherein $B_{real}$ and $B_{imag}$ are integer numbers. In other words, by applying the modulo operation of equation (4) to the real and imaginary parts of each of the points in the expanded output constellation, the corresponding points in the input constellation of FIG. 2A are recovered. In this manner, the symbols output by transmitter 20 are related by modulo 2M to the input symbols generated by encoder 22.

FIG. 4B shows the spectrum of the output signals in the constellation of FIG. 4A. A notch 62 of greater than 20 dB is generated at a selected frequency, in this case at a normalized frequency of approximately 0.2.

While the present embodiment is described herein with reference to notch filtering, digital filters 26 and 28 may be used to implement a wide range of other digital filter types. These filters may include both infinite impulse response (IIR) and finite impulse response (FIR) types. In one alternative embodiment, for example, filters 26 and 28 also comprise adaptive digital filters, which are adjusted for the purpose of "water filling," i.e., to shape the output power spectral density of transmitter 20 to optimally match the spectral characteristics of channel 30. Other shaping functions may similarly be implemented, either with or without the additional notch filtering function described herein.

Returning now to FIG. 1, the output symbols generated by transmitter 20 are conveyed as an electrical signal by channel 30, which typically comprises a twisted-pair connection, to receiver 40. The channel adds noise and distortion to the signal, as is known in the art. Signals received by receiver 40 are processed, digitized and down-converted by analog front end 35 and down-converter 37. The signals are then passed as a sequence of digital samples to an equalization and decision block 45. This block typically includes a forward filter equalizer (FFE) 32 and a decision feedback equalizer (DFE) 36, preferably comprising multi-tap filters having coefficients that are determined adaptively to compensate for the effects of channel 30, as is known in the art. Because of the preceding applied by precoder 25, however, there is no need for equalizers 32 and 36 to compensate for distortion due to the effect of digital filter 26 in transmitter 20. Consequently, DFE 36 in receiver 40 generally can have fewer taps and be of simpler design, with less concern for problems of error propagation, than in VDSL receivers that are known in the art. It is desirable, however, that FFE 32 include a sufficient number of taps so as to substantially reduce the energy level of precursors in the received signals. Generally, a FFE that Is designed to deal adequately with the response of channel 30 alone (without the effect of Tx filter 26 in the transmitter) will be able to deal satisfactorily with the precursor level.

Samples output by forward equalizer 32 and decision feedback equalizer 36 are summed by an adder 33 and are then processed by an extended slicer 34. The slicer takes real and imaginary parts of each sample and assigns the sample to a corresponding point in the expanded constellation of FIG. 4A, so as to recover the symbols that were output by transmitter 20. It is termed an "extended slicer" since it must deal with the expanded constellation of FIG. 4A, but otherwise it is substantially similar in design and function to slicers known in the art. A modulo reduction device 38, substantially similar to device 24, applies the modulo operation of equation (4) to each of the recovered symbols, and thus generates a sequence of QAM symbols in the constellation of FIG. 2A. These symbols are processed by a decoder 42 to generate an output stream of digital data, reproducing the data that were input to transmitter 20.

Although preferred embodiments are described herein with particular reference to next-generation, ultra-high speed transmission systems, such as VDSL and HPNA, other applications of the principles of the present invention will be apparent to those skilled in the art. These principles may be adapted for use in substantially any transmitter/receiver pair that communicates by single-carrier modulation. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A high-speed transmitter, which generates an output signal stream having a specified spectral profile, the transmitter comprising:

a Tomlinson-Harashima precoder, which is adapted to receive a sequence of input symbols having a given input constellation and to generate, responsive to the specified spectral profile, a corresponding sequence of precoded symbols; and a transmit digital filter, which is adapted to apply a transmit filter response, in accordance with the specified spectral profile, to the precoded symbols so as to generate a corresponding sequence of output symbols, having a given output constellation, to be transmitted in the output stream.

2. A transmitter according to claim 1, wherein the output constellation is expanded relative to the input constellation.

3. A transmitter according to claim 2, wherein the output constellation is expanded such that the input symbols in the sequence can be recovered by taking a modulo of the corresponding output symbols.

4. A transmitter according to claim 3, wherein the input and output symbols have respective real and imaginary parts, and wherein the real and imaginary parts of the input symbols in the sequence can be recovered by taking a two-dimensional modulo of the real and imaginary parts of the corresponding output symbols.

5. A transmitter according to claim 1, wherein the digital filter comprises a notch filter.

6. A transmitter according to claim 5, wherein the notch filter is configured to prevent radio-frequency interference due to the output stream of the transmitter in a predetermined frequency band, as specified by the spectral profile.

7. A transmitter according to claim 1, wherein the transmitter is configured to transmit the output stream over a channel having given spectral characteristics, and wherein the spectral profile is specified substantially independently of the spectral characteristics of the channel.

8. A transmitter according to claim 7, wherein the precoder and digital filter are further configured to optimize an output power spectral density of the transmitter responsive to the spectral characteristics of the channel.

9. A transmitter according to claim 1, wherein the precoder comprises:

a feedback digital filter, which is adapted to apply a feedback filter response to the sequence of precoded symbols so as to generate a corresponding sequence of feedback symbols, wherein the feedback filter response is substantially equal to the transmit filter response less a zero-order time-domain component of the transmit filter response;

a subtractor, adapted to subtract the feedback symbols from the corresponding input symbols, so as to generate a corresponding sequence of subtracted symbols; and a modulo mapping device, adapted to map the subtracted symbols to the corresponding precoded symbols, such that each of the subtracted symbols in the sequence can be recovered by taking a modulo of the corresponding precoded symbol.

10. A transmitter according to claim 9, wherein the symbols comprise Quadrature Amplitude Modulation (QAM) symbols, having respective real and imaginary parts, and wherein the modulo mapping device is adapted to map both the real and imaginary parts of the subtracted symbols.

11. A transmitter according to claim 1, wherein the output signal stream comprises Very High Rate Digital Subscriber Line (VDSL) signals.

12. A receiver, adapted to receive the output stream generated by the transmitter of claim 1 and transmitted over a channel, the receiver comprising:

a decision block, adapted to process the output stream so as to substantially recover the sequence of output symbols; and a modulo reduction device, adapted to take a modulo of each of the recovered output symbols so as to generate the corresponding input symbol.

13. A receiver, adapted to receive an input stream of digital data containing a sequence of input symbols having a given constellation, wherein the input symbols are derived from a corresponding sequence of original symbols by a transmitter that includes a Tomlinson-Harashima precoder and are transmitted over a channel, the receiver comprising:

a decision block, which is configured to process the input stream so as to substantially recover the sequence of input symbols from the input stream; and a modulo reduction device, adapted to take a modulo of each of the recovered input symbols so as to generate the corresponding original symbol.

14. A receiver according to claim 13, wherein the decision block comprises:

a decision feedback equalizer, which is configured to apply decision feedback filtering to the recovered sequence of input symbols, so as to generate a corresponding sequence of decision feedback symbols;

a forward filter equalizer, which is configured to apply forward equalization to the input stream so as to generate a sequence of forward-equalized symbols;

an adder, adapted to add the decision feedback symbols to the forward-equalized symbols to generate a corresponding sequence of corrected symbols; and an extended slicer, adapted to assign each of the corrected symbols to a corresponding value in the given constellation, thereby to substantially recover the sequence of input symbols.

15. A receiver according to claim 13, wherein the input symbols comprise Quadrature Amplitude Modulation (QAM) symbols, having respective real and imaginary parts, and wherein the modulo reduction device is adapted to take a modulo of both the real and imaginary parts of the recovered input symbols.

16. A receiver according to claim 13, wherein the input stream of digital data comprises Very High Rate Digital Subscriber Line (VDSL) signals.

17. A method for generating an output stream of digital data having a specified spectral profile, the method comprising:

providing a sequence of input symbols having a given input constellation;

preceding the input symbols using Tomlinson-Harashima precoding responsive to the specified spectral profile, so as to generate a corresponding sequence of precoded symbols; and filtering the precoded symbols in accordance with the specified spectral profile, so as to generate a corresponding sequence of output symbols to be transmitted in the output stream, the output symbols having a given output constellation.

18. A method according to claim 17, wherein the output constellation is expanded relative to the input constellation.

19. A method according to claim 17, wherein preceding the input symbols comprises applying the Tomlinson-Harashima precoding such that each of the input symbols can be recovered by taking a modulo of the corresponding output symbol.

20. A method according to claim 19, wherein providing the sequence of input symbols comprises providing symbols having real and imaginary parts, and wherein precoding the input symbols comprises precoding both the real and imaginary parts of the input symbols such that both the real and imaginary parts can be recovered by taking a two-dimensional modulo of the real and imaginary parts of the corresponding output symbols.

21. A method according to claim 20, wherein providing the symbols comprises providing Quadrature Amplitude Modulation (QAM) symbols.

22. A method according to claim 17, wherein filtering the precoded signals comprises applying a notch filter to the signals.

23. A method according to claim 22, wherein applying the notch filter comprises attenuating radio-frequency signals in the output stream of the transmitter in a predetermined frequency band, so as to avoid generating radio frequency interference in that band, as specified by the spectral profile.

24. A method according to claim 17, wherein the output stream is to be transmitted over a channel having given spectral characteristics, and wherein the spectral profile is specified substantially independently of the spectral characteristics of the channel.

25. A method according to claim 24, wherein filtering the interim symbols further comprises optimizing a power spectral density of the output stream responsive to the spectral characteristics of the channel.

26. A method according to claim 17, wherein filtering the interim symbols comprises applying a transmit filter response to the interim symbols, and wherein preceding the input symbols comprises:

filtering the sequence of precoded symbols by applying a feedback filter response thereto, so as to generate a corresponding sequence of feedback symbols, wherein the feedback filter response is substantially equal to the transmit filter response less a zero-order time-domain component of the transmit filter response;

subtracting the feedback symbols from the corresponding input symbols, so as to generate a corresponding sequence of subtracted symbols; and mapping the subtracted symbols to the corresponding precoded symbols, such that each of the subtracted symbols in the sequence can be recovered by taking a modulo of the corresponding precoded symbol.

27. A method according to claim 26, wherein providing the input symbols comprises providing Quadrature Amplitude Modulation (QAM) symbols, having respective real and imaginary parts, and wherein mapping the subtracted symbols comprises mapping both real and imaginary parts of the subtracted symbols.

28. A method according to claim 17, and comprising generating Very High Rate Digital Subscriber Line (VDSL) output signals based on the sequence of output symbols.

29. A method according to claim 17, and comprising:
receiving the output stream over a channel having a given channel response;
applying a decision feedback equalizer to substantially recover the sequence of output symbols from the received output stream; and
taking a modulo of each of the recovered output symbols so as to generate the corresponding input symbol.

30. A method according to claim 29, wherein applying the decision feedback equalizer comprises:
sampling the received output stream so as to generate a sequence of samples;
equalizing the samples in the sequence so as to compensate for the channel response; and
assigning each of the corrected symbols to a corresponding value in the given output constellation, thereby to substantially recover the sequence of input symbols.

* * * * *

UNITED STATES PATENT AND TRADEMARK OFFICE
CERTIFICATE OF CORRECTION

| | | |
|---|---|---|
| PATENT NO. | : 6,411,657 B1 | Page 1 of 1 |
| APPLICATION NO. | : 09/476747 | |
| DATED | : June 25, 2002 | |
| INVENTOR(S) | : Verbin et al. | |

It is certified that error appears in the above-identified patent and that said Letters Patent is hereby corrected as shown below:

Column 12, line 11, "preceding" should be --precoding--

Column 12, line 22, "preceding" should be --precoding--

Column 12, line 57, "preceding" should be --precoding--

Signed and Sealed this

Thirty-first Day of May, 2011

David J. Kappos
*Director of the United States Patent and Trademark Office*